United States Patent

[11] 3,612,234

[72] Inventor Alexander J. Albrecht
 Franklin Lakes, N.J.
[21] Appl. No. 13,981
[22] Filed Feb. 25, 1970
[23] Division of Ser. No. 719,801, Nov. 13, 1967, Pat. No. 3,499,648, which is a division of Ser. No. 388,051, Aug. 7, 1964, Pat. No. 3,409,296
[45] Patented Oct. 12, 1971
[73] Assignee Brunswick Corporation

[54] ONE-REVOLUTION CLUTCH
 4 Claims, 6 Drawing Figs.
[52] U.S. Cl. .................................................. 192/28, 192/33, 192/148
[51] Int. Cl. .......................................... F16d 71/00
[50] Field of Search ........................................ 192/28, 33, 148

[56] References Cited
UNITED STATES PATENTS

| 2,436,112 | 2/1948 | Machado | 192/28 |
| 2,559,117 | 7/1951 | Falk | 192/28 UX |
| 2,774,385 | 12/1956 | Rabaseda | 192/46 X |
| 2,853,169 | 9/1958 | Usselmann | 192/33 X |
| 2,858,388 | 10/1958 | Eastman | 192/28 X |

Primary Examiner—Allan D. Herrmann
Attorney—Hofgren, Wegner, Allen, Stellman & McCord ABSTRACT: A one-revolution clutch mechanism having a pivotal pawl on a driven member for selective engagement with a rotatable driver member as controlled by a pawl-engaging stop, and power means effective when the pawl is adjacent the stop and operative to urge the driven member in the direction of rotation of the driver member at the point of engagement and disengagement.

INVENTOR.
ALEXANDER J. ALBRECHT
BY Hofgren, Wegner, Allen, Stillman, McCord
ATTORNEYS.

ONE-REVOLUTION CLUTCH

CROSS-REFERENCES TO RELATED APPLICATIONS

This application is a division of application Ser. No. 719,801, filed Nov. 13, 1967, now Pat. No. 3,499,648 which is a division of application Ser. No. 388,051, filed Aug. 7, 1964, now U.S. Pat. No. 3,409,296, issued Nov. 5, 1968.

SUMMARY

An object of this invention is to provide a new and improved one-revolution clutch mechanism providing improved operation by additional power means which insures complete rotation of the clutch driven member through one revolution and which provides an initial force urging the driven member in the direction of the driving member upon interengagement.

Figure 1:
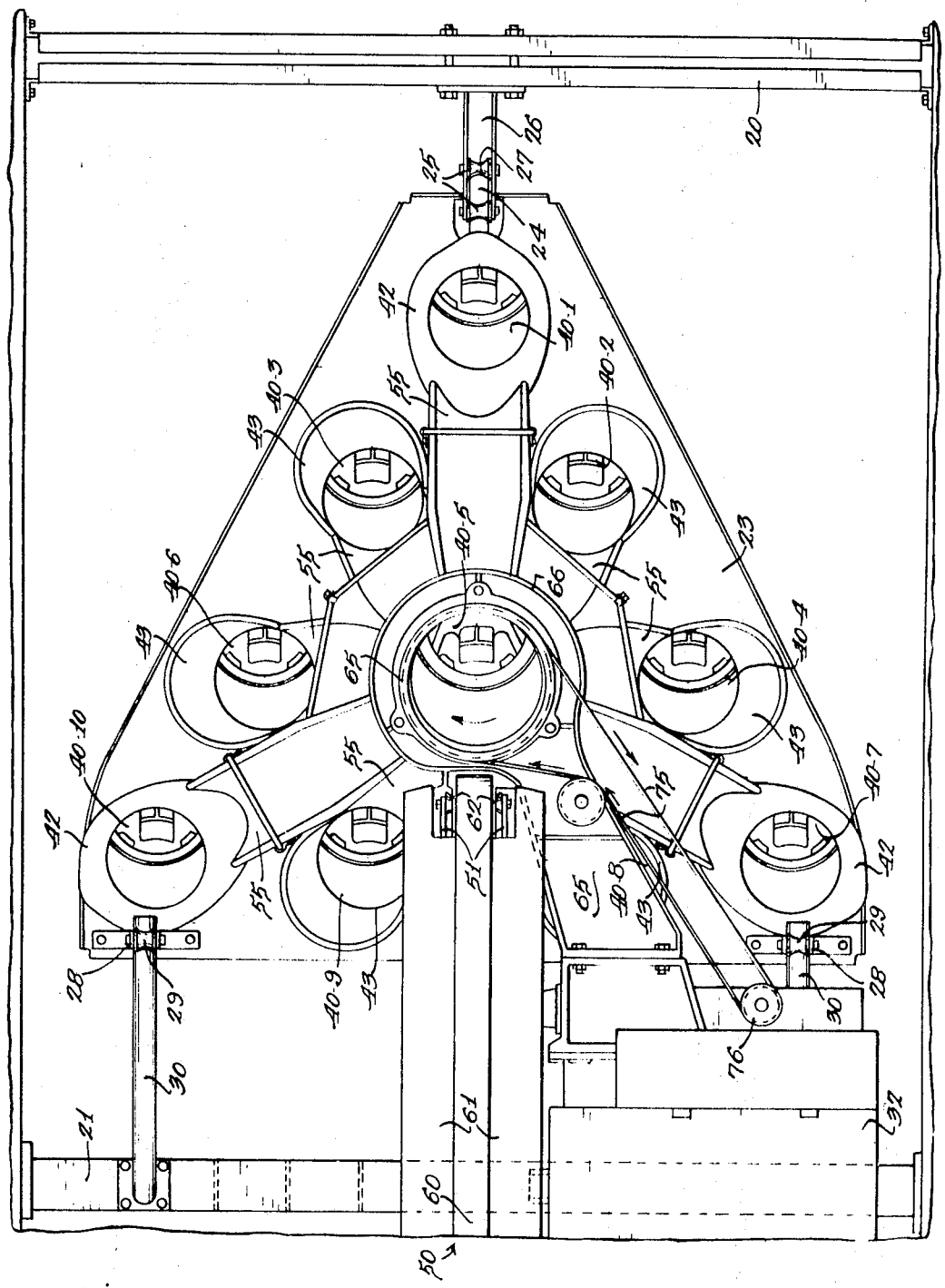
FIG. 1 is a fragmentary plan view of a pin distributor mechanism in an automatic pinsetter.

While an illustrative embodiment of the invention is shown in the drawings and will be described in detail herein, the invention is susceptible to embodiment in many different forms, and it should be understood that the present disclosure is to be considered as an exemplification of the principles of the invention and is not intended to limited the invention to the embodiment illustrated. The scope of the invention will be pointed out in the appended claims.

DESCRIPTION OF THE PREFERRED EMBODIMENT

The invention is herein disclosed as incorporated in the drive mechanism of an automatic bowling pinsetter disclosed in the parent U.S. Pat. No. 3,499,648. The action of the clutch of the invention is triggered by bowling pins being delivered by a conveyor belt to the pin-setting apparatus as illustrated in FIG. 1. The apparatus of the pinsetter thus illustrates only one end use of the invention.

Referring now to FIG. 1, suitable means (not shown) deposit bowling pins in a series on belt 60 of conveyor mechanism 50 with the base end of the pins leading, in which position the pins are carried upwardly in a series between opposite upwardly and outwardly inclined side-retaining walls 61. As a pin base engages pin gate 51, the pin gate is pivoted about a pin 64 which mounts the pin gate on a frame portion of conveyor mechanism 50, so that pin gate 51 moves from a normal-sensing position I, to a pin-blocking position II, see FIG. 10. When pins are to be distributed a suitable signal is fed to a control-gear system, and with pin gate 51 in pin-blocking position another signal is sent to the gear system indicating that a pin is available for passage to distributing mechanism 52 whereupon the gear system moves pin gate 51 from pin-blocking position to a pin-passing position III, as indicated by phantom lines in FIG. 5, whereupon conveyor belt 60 carries a pin past pin gate 51 and deposits it base end leading into chute 53 for distribution by pin distribution mechanism 52. Pin gate 51 then returns to pin-sensing position shown in FIG. 2.

Means for (1) operating pin gate 51, (2) indexing chute 53 step-by-step about a vertical axis for depositing bowling pins in holding position on guides 55, (3) pivoting lower chute portion 71 downwardly from normal position to intermediate holding position with a pin resting on lower chute portion 71 and bumper 91 on center bucket 41, and (4) pivoting lower chute lower chute portion 71 downwardly an additional amount from intermediate-holding position to pin-releasing position, while elevating guides 55 for tipping pins into a generally vertical position for passage through the buckets to lower movable deck 22; is provided in the illustrated embodiment of the one-revolution clutch mechanism.

CONTROL GEAR SYSTEM

Power Input For Gear System

Figure 3:
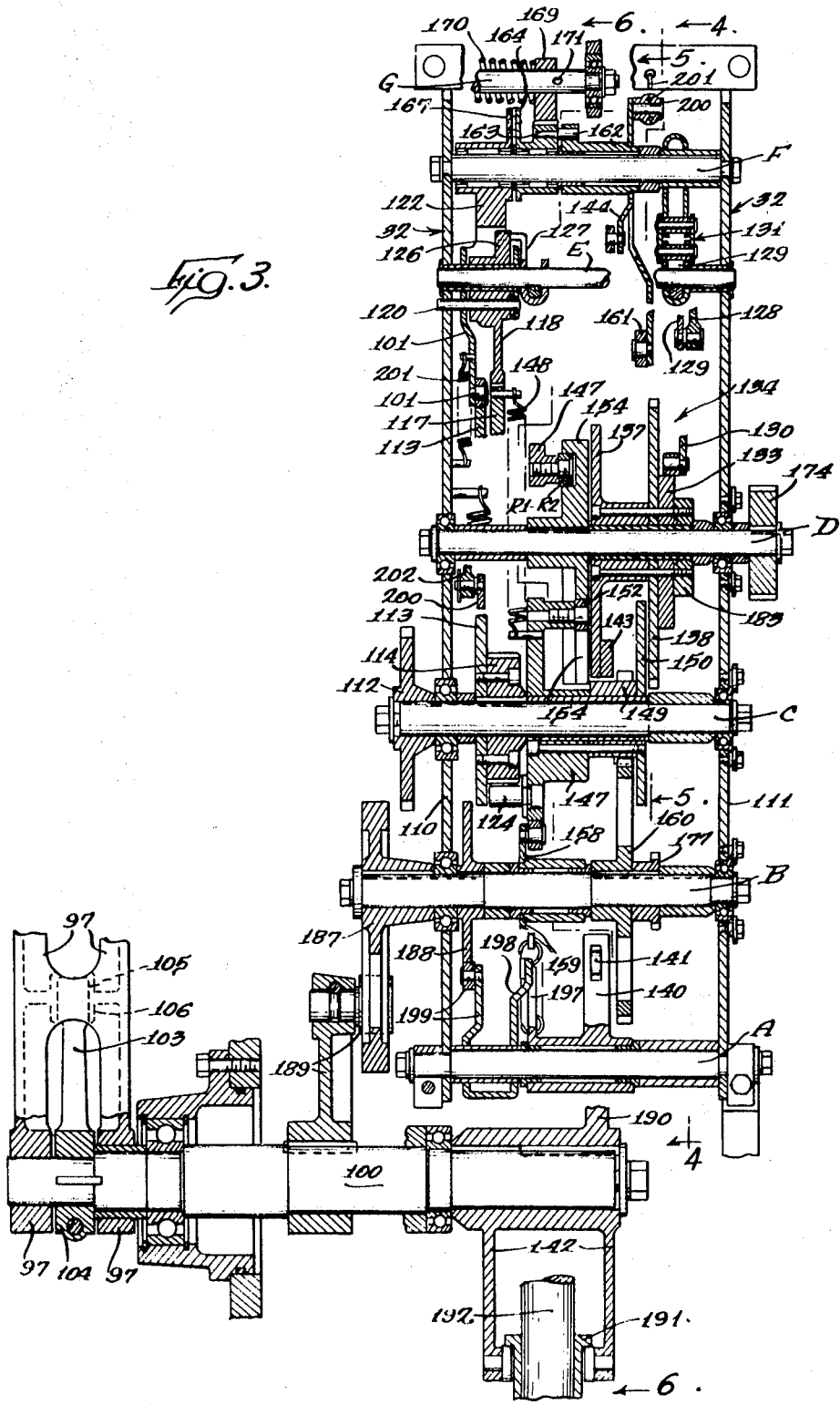
FIG. 3 is a cross-sectional view of a drive gear box for an automatic pinsetter incorporating a one-revolution clutch of the invention.
Figure 4:
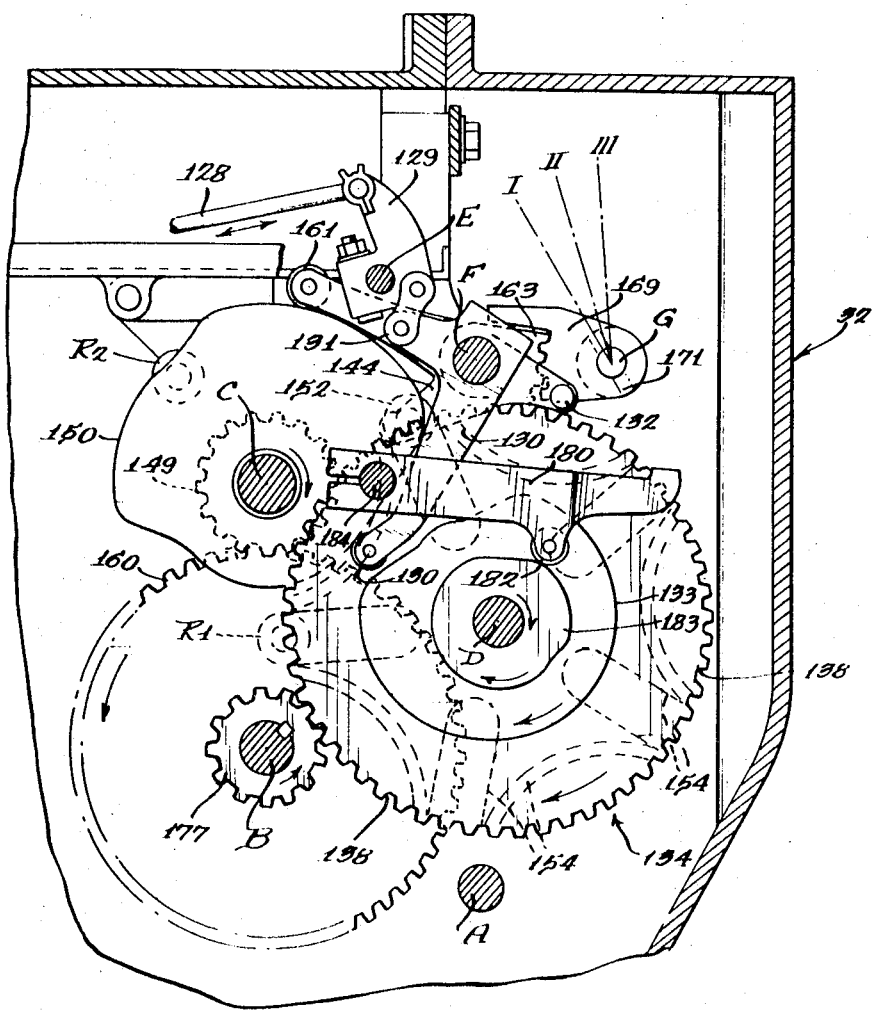
FIG. 4 is a sectional view taken generally along the line 4—4 in FIG. 3.

Referring to FIG. 3, the gear system is driven by chain sprocket 112 mounted on shaft C for rotation therewith. Thus, shaft C is the main power input shaft of the system and, in turn, drives various elements of the gear assembly. Shaft C is continuously driven clockwise as viewed in FIG. 4 at constant speed by the chain sprocket, e.g. at about one revolution per second. Chain sprocket 112, a pulse cam 113 and a ratchet wheel 114 are each keyed and axially constrained on shaft C.

Pulse cam 113 and ratchet wheel 114, the driving member of the one-revolution clutch, are bolted together in such a way that a centerline through the peak of each of the equally spaced rises on pulse cam 113 (FIG. 5) slightly trails a centerline through one of the equally spaced slots in ratchet wheel 114 (FIG. 6) in the direction of rotation, in order that the latching end of a pawl 117 (pivotally mounted on a pin 124) will contact the outer surface of wheel 114 when released by a pawl stop 118 (freely rotating and axially constrained on shaft E.)

In the form of pulse cam 113 illustrated (FIG. 5), six rises are included. Pulse cam 113 provides the power source for pulse cam follower 119 which pivots around a movable pin 120, fastened to a ratchet pawl stop 118. Follower 119 includes a roller which rides on pulse cam 113 and is spring-loaded to frame 110 in a counterclockwise rotation to insure contact with pulse cam 113. Integral with the follower 119 is a finger 121. When finger 121 does not contact anvil 122, follower 119 is free to rotate about pivot pin 120, which connects the pulse cam follower 119 to ratchet pawl stop 118. Pin 120 is fastened to pawl stop 118 and extends over the side of frame 110, using frame 110 as a downward limit stop for pawl stop 118.

Figure 6:
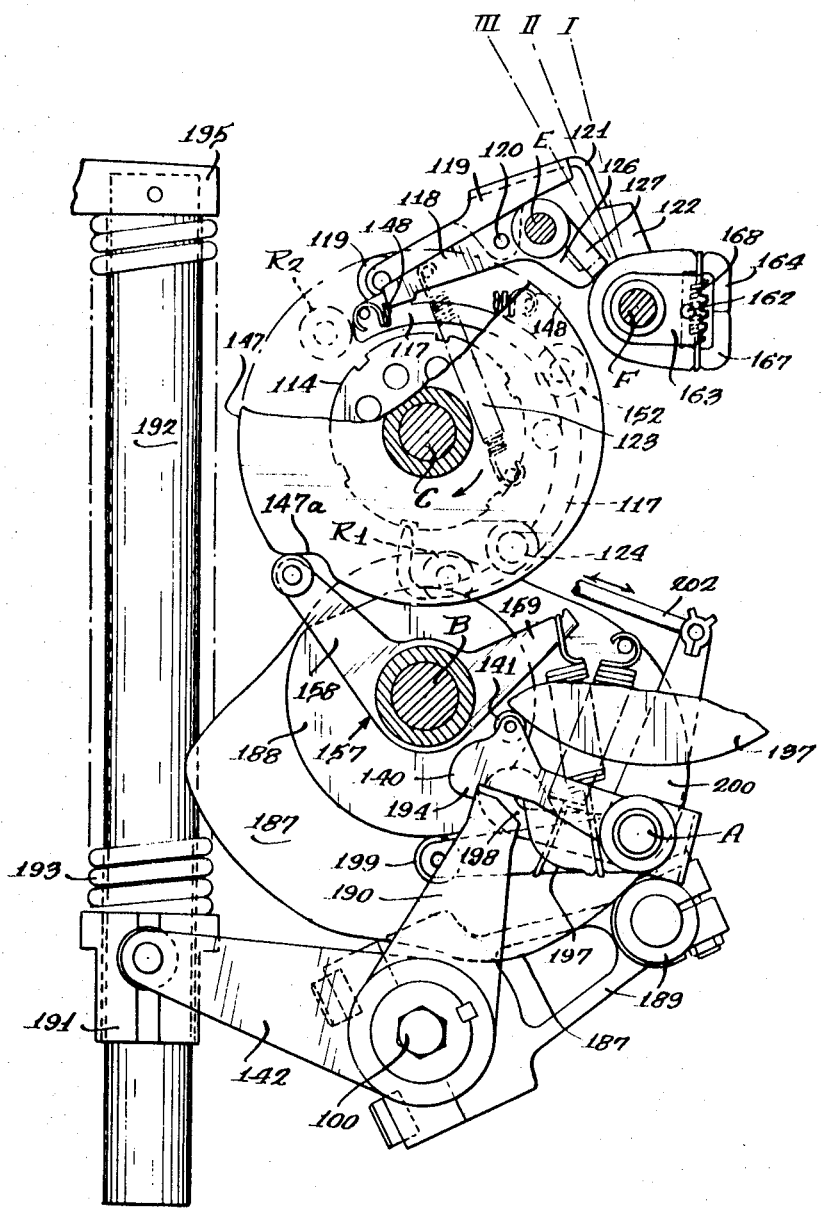
FIG. 6 is a sectional view taken generally along the line 6—6 of FIG. 3.

Referring to FIG. 6, ratchet pawl stop 118 is freely rotatable on shaft E and spring-loaded counterclockwise about shaft E by spring 123 on pulse cam follower 119 and pivot pin 120. Pawl stop 118 normally latches to pawl 117, preventing pawl 117 from pivoting about pin 124 and engaging in ratchet wheel 114. A contact arm portion 126 is provided as an extension of ratchet pawl stop 118 and contacts the trip arm 127 which, upon a release signal by the signal rod 128 (which connects with the pin detector mechanism) moves ratchet pawl 118 upward, releasing pawl 117.

Ratchet pawl 117 is pivotally mounted on pin 124 which is in turn bolted to a Geneva driver 147. Pawl 117 is normally disengaged from ratchet wheel 114 and latched to ratchet pawl stop 118. The outer surface of pawl 117 is so shaped that pawl stop 118 can smoothly engage and depress the spring-loaded latching end of pawl 117 into the position shown in FIG. 6. The end of pawl 117 which latches to stop 118 is spring-loaded in a clockwise direction about pin 124 by spring 148. The opposite end of spring 148 is anchored to a pin on driver 147.

Ratchet pawl 117, when released by ratchet pawl stop 118, engages ratchet wheel 114 enabling Geneva driver 147 to rotate with shaft C. The end of pawl 117, which latches to wheel 114 is curved on the illustrated form (FIG. 6) to permit deflection of pawl 117 at the moment of engagement with wheel 114 to protect against heavy shock loads which may result from almost instantaneous acceleration of the masses attached to pawl 117. Because of such heavy shock loads, pawl 117 is fabricated of resilient material, preferably of high-impact strength, such as high-quality spring steel.

Referring to FIG. 3, ratchet wheel 114, keyed to shaft C and bolted to pulse cam 113, rotates clockwise as viewed in FIG. 6 with shaft C.

Geneva driver 147 freely rotates on shaft C and is rigidly bolted to pinion 149 and pin gate cam 150 which also rotate freely on shaft C. Driver 147, pinion 149 and cam 150 are all axially constrained on shaft C. On the side of Geneva driver 147 facing frame 110 are provided the ratchet pawl pivot pin 124, a pawl stop and a stud serving as anchor for the ratchet pawl spring 148. On the opposite side of driver 147, facing frame 111, cam roller 152 functions as the driver for Geneva wheel 154, and two other rollers $R_1$ and $R_2$ are provided as Geneva wheel stop guides. The circumference of the Geneva driver 147 is a cam surface upon which the arm 158 of pawl accelerator 157 rides. Pawl accelerator 157 is freely rotatable on shaft B and includes two arms, one of which is follower 158 which rides on the outer cam surface of Geneva driver 147 and the other of which is arm 159 which carries a spring for urging cam follower 158 into Geneva driver 147. The cam surface of Geneva driver 147 is shaped so that follower 158 will provide additional motion to driver 147 when the ratchet pawl 117 is being disengaged from ratchet wheel 114.

Figure 5:
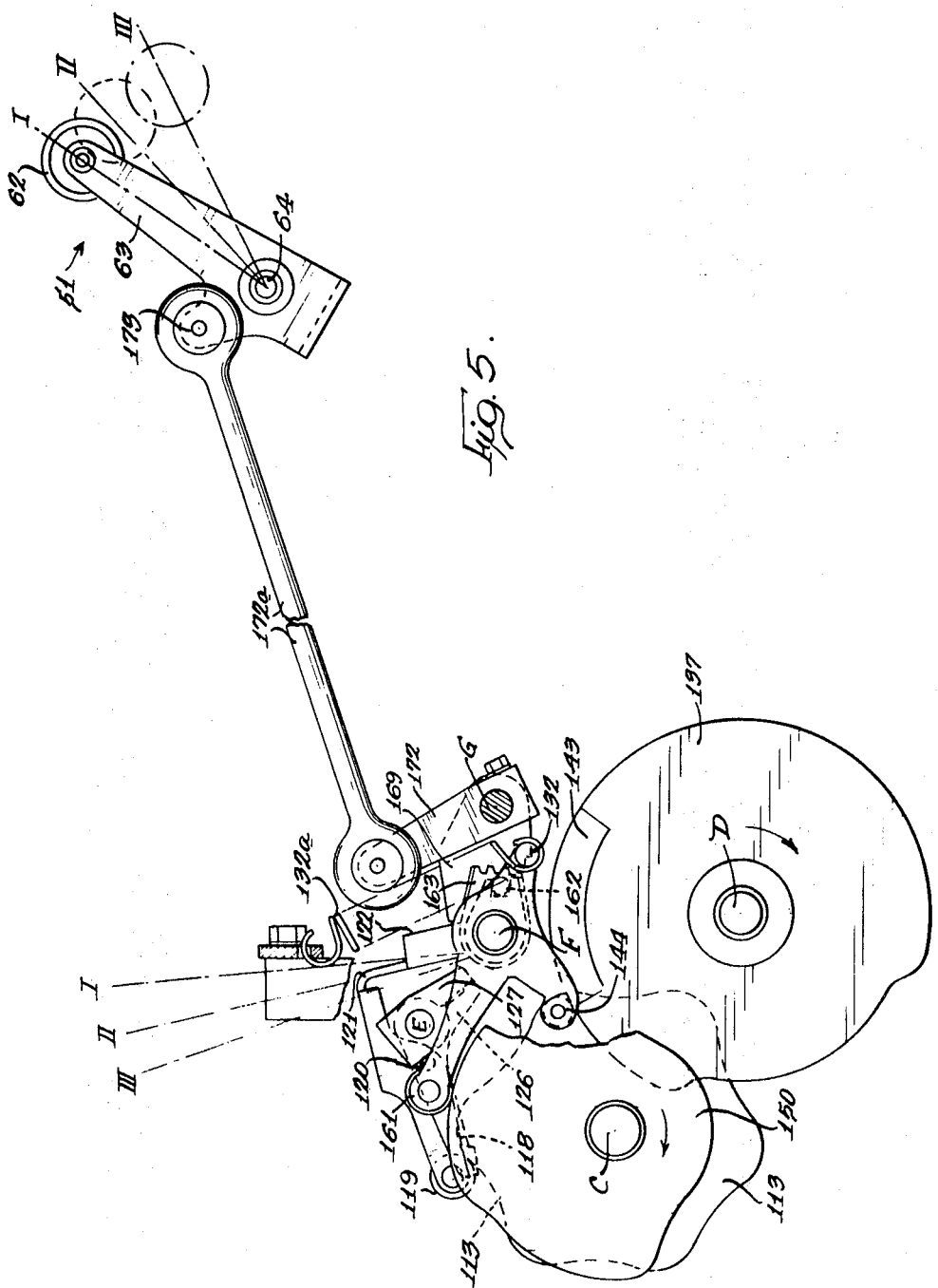
FIG. 5 is a sectional view taken generally along the line 5—5 in FIG. 3.

Referring to FIG. 5, as indicated above, pin gate 51 has three working positions: (1) position 0I or the pin-sensing position in which pin gate 51 is in its uppermost position for sensing presence of pins; (2) position 0II or the pin-blocking position in which pin gate 51 is in its intermediate position and blocking the passage of pins; and (3) position 0III in which the pin gate 51 permits passage of a pin. The three positions of pin gate 51 correspond to the three positions of follower anvil 122. The construction permits a bowling pin to move pin gate 51 from position I to position II upon contact of a pin with the gate.

Figure 2:
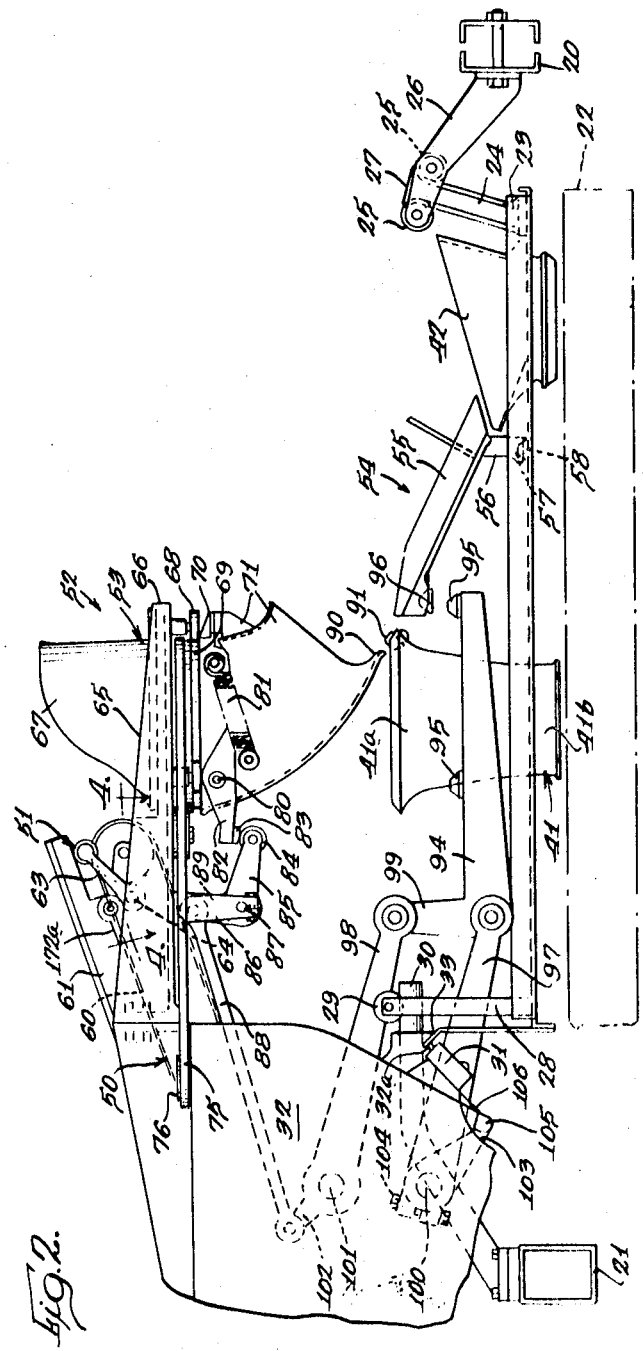
FIG. 2 is a fragmentary side view of a portion of the mechanism shown in FIG. 1, with parts removed for clearer illustration.

Pin gate 51 is in position I prior to the first indexing step with lower chute 71 in its raised position and directed towards the 01 pin position, with no pins against pin stops 62 and with no pins in the distributor mechanism. Pin gate 51 is maintained in position I as long as a bowling pin does not depress the pin gate to position III. Cam follower 161, with pin gate 51 in position I, rides on the middle of cam 150. The cross conveyor belt 50 transports pins toward pin gate 51 as illustrated in FIG. 2. Since the cross conveyor belt 50 is running constantly, it will push the pins against pin stops 62 thereby urging pin gate 51 in a clockwise rotation about shaft 64. Between each of the first through tenth steps of operation, the pin gate cam 150 makes one revolution per cycle, cam follower 161 rides on the high portion of cam 150 which in turn moves pin gate 51 to position I blocking the passage of each succeeding pin. Follower 161 then rides on middle portion of cam 150 and pin gate 51 moves to position II.

To place pin gate 51 in position III, cam follower 161 rides from the middle to the lower portion of cam 150. Further rotation of cam 150 returns pin gate 51 from position III to position I during the middle of each of the first through tenth steps.

Shaft C is continuously rotating, carrying pulse cam 113 and ratchet wheel 114 in clockwise rotational direction. Whenever pawl 117 is disengaged from wheel 114, the Geneva driver 147, pinion 161, and pin gate cam 150 are held stationary by stop 118.

A one-revolution clutch mechanism is provided by the combination of wheel 114, stop 118, pawl 117, driver 147, pinion 160 and pin gate cam 150 in which Geneva driver 147 is the output driver member, and wheel 114 is the pawl receiving member. This mechanism provides the drive for all output motions.

Prior To First Control Step the conditions of the indexing mechanism immediately prior to the first of the twelve steps in the cyclic operation, with pin gate 51 in position I, are as follows: referring to FIGS. 5 and 6, with shaft C, pulse cam 113 and ratchet wheel 114 rotating, follower 161 is about to leave the middle portion of cam 150. Anvil 122 is maintained in position I. Pawl stop 118 is latched to pawl 117 and holds pawl 117 from wheel 114 thereby maintaining pin 120 stationary. PUlse cam follower 119 is continuously oscillating up and down about pin 120 in reaction to the rises and drops of the pulse cam 113 and finger 121 missing anvil 122. Chute 71 is in the raised position indexed toward the 01 pin position of the stationary deck 23.

The conditions of the indexing mechanism immediately prior to the first step of operation with pin gate 51 in position II are the same as those with pin gate 51 in position except that anvil 122 moves to position II as a result of the action of a bowling pin against pin stops 62; finger 121 contacts the top of anvil 122 and follower 119 rises on a rise of cam 113, thereby urging pin 120 to rotate clockwise about shaft E (FIG. 5) raising stop 118 causing it to disengage pawl 117; spring 148 urges the latching end of pawl 117 into contact with the outer periphery of wheel 114 for sliding thereon until pawl 117 engages the next slot in wheel 114.

Finger 121 and anvil 122 are adapted so that anvil 122 can slip under finger 121 when follower 119 rides on a drop of cam 113. Anvil 122 is urged against oscillating finger 121 by spring 168 until follower 119 rides on a low dwell of cam 113 raising finger 121 and permitting the anvil 122 to rotate under finger 121. When follower 119 rides on a rise of cam 113, finger 121 contacts the top of anvil 122 and the pawl 117 is released as described.

During First Control Step

Operation Of Pin Gate

During the first step of operation, pin gate 51 is moved to position II by urging of a pin thereagainst and pawl 117 fully engages wheel 114. In the one-revolution clutch mechanism, the constantly rotating ratchet wheel 114 will now carry the pawl 117 and Geneva driver 147, attached thereto by pin 124, along with it, and pinion 149 and pin gate cam 150 rotate with Geneva driver 147.

The first output motion of the one-revolution clutch mechanism is provided by driver 147 through cam 150 to pin gate 51. Immediately after pawl 117 drives cam 150, follower 161 will drop from the middle to the low portion of cam 150, to permit a bowling pin to pass to the distributor mechanism 52. For just enough time to allow one bowling pin to be released by pin gate 51, follower 161 will remain on the low portion of cam 150, e.g. approximately one-third of a revolution, and anvil 122 and pin gate 51 will remain in position III.

As the pin gate cam 150 rotates through another portion e.g. approximately the second one-third revolution, it will return follower arm 161 to position I (FIG. 5) and in so doing move anvil 122 and pin gate 51 from position III to I, blocking the passage of the succeeding bowling pin. Finger 121 misses anvil 122 thereby allowing spring 123 attached to follower 119 to urge pin 120 counterclockwise about shaft E to its initial stationary position (FIG. 6,) returning the follower 119 to its normal-pivoting position about pin 120 and returning stop 118 about shaft E to its downward position.

Stop 118 remains with pin 120 against frame 110 and down in position to stop pawl 117 at the end of one revolution of cam 150. Ratchet pawl 117 will remain latched to wheel 114 for one complete revolution. During the last portion, e.g. one-third of the revolution of wheel 114 while follower 161 is on the high portion of cam 150, stop 118 rides on the outer surface of pawl 117, depressing pawl 117 to the position shown in FIG. 6. The physical relation of cam 113 to ratchet wheel 114 is such that stop 118 will be lifted at the moment the latching end of pawl 117 (which latches to wheel 114) passes underneath stop 118. Pawl 117 will not disengage from wheel 114 until the instant that the end of stop 118 contacts the radial surface of the spring-loaded latching end of pawl 117. At this instant, pawl 117 is still engaged in wheel 114. Spring 148 exerts a counterclockwise movement on the driver 147 through pin 124, attempting to turn driver 147 in that direction. This counterclockwise movement is opposed by the inertia of the parts rotating with pawl 117 and by a force applied by pawl accelerator arm 158 to a cam rise 147a on the face of Geneva driver 147 as shown in FIG. 6. The cam rise 147a on Geneva driver 147 is so positioned with respect to pawl 117, and the force applied by pawl accelerator 157 (supplied by a spring connected between arm 159 and arm 197) is of such magnitude, that the resulting clockwise movement more than overcomes the counterclockwise movement of spring 148 and allows freedom of disengagement of pawl 117 from a slot in ratchet wheel 114 so that as the tip of pawl 117 slips out of the slot of wheel 114 a diminishing contact area and a constant drive force does not result in a mounting pressure per unit area, tending to damage the edges of both parts. In this configuration pawl accelerator 157 comprises a power member urging cam 147 in the direction of continued motion, and cam follower arm 158 comprises a movable member which is urged against the cam surface of the driver 147.

Control Of Funnel Indexing

The second output motion is provided by driver 147, which converts the single power input to sprocket 112 and shaft C into angular output motions, through Geneva 154. Driver 147 performs one revolution with pawl 117. In one revolution of driver 147, follower 152 engages one of the five slots in Geneva 154 and rotates it counterclockwise one-fifth of a revolution. Follower or roller 152 engages with and drives Geneva 154 when follower 161 rides on the low portion of cam 150, and driver 152 will disengage from Geneva 154 when follower 161 rides on the high portion of cam 150. The rollers $R_1$ and $R_2$ are positioned to maintain Geneva 154 in the position shown in FIG. 9 during the time that follower 161 rides on the high and middle portions of cam 150. The rotation of Geneva 154 assures fast positioning of the distributor funnel assembly so that the lower chute 71 is directed toward the required bowling pin storage position in the stationary deck 23 prior to the bowling pin leaving the funnel assembly. Each station of wheel 154 represents one indexing step for the distributor funnel assembly and Geneva 154 indexes and comes to a stop near the beginning of each step.

The third output motion from driver 147 is through pinion 149 to distributor lift arm 97 illustrated in FIG. 3. Pinion 149 makes one revolution per cycle with driver 147, when pawl 117 is engaged with wheel 114 and pinion 149 meshes with gear 160 which is keyed and clamped to shaft B. Engagement of pinion 149 and gear 160 provides a three to one speed reduction from driver 147 to shaft B which means that it requires three rotations of driver 147 to obtain one rotation of shaft B. Keyed to shaft B and rotating with it are gear 160 and pinion 177. Pinion 177 meshes with gear 138, which is part of gear and cam cluster 134, providing a four to one speed reduction from shaft B to shaft D and a 12 to one speed reduction from shaft C to shaft D. The above described operation of portions of an automatic pinsetter mechanism driven by a one-revolution clutch of the invention serves to illustrate its utility, particularly in the driving of heavy machinery where high loads are involved.

I claim:

1. A one-revolution clutch mechanism comprising a pawl-receiving member mounted on a rotatable shaft for rotation therewith, an output driver member freely rotationally mounted on said shaft, pawl means pivotally mounted on said driver member and having an element movable into engagement with said pawl-receiving member to cause rotation of said driver member by the pawl-receiving members, means yieldably urging said pawl means in a direction to cause said engagement, a movable stop engageable in one position thereof with a stop surface on the pawl means to hold said element out of engagement, and means acting on the output driver member when positioned at the point of engagement of said pawl means for urging of the output driver member in the direction of its rotation.

2. A one-revolution clutch mechanism as defined in claim 1 wherein the means for urging the output driver member in the direction of its rotation includes a cam connected to said output driver member with a cam slope, and a power member urged toward said cam and against said cam slope when the pawl stop surface is adjacent the stop to apply a rotationally directed force to the cam and output driver member.

3. A one-revolution clutch mechanism as defined in claim 2 wherein said cam slope is engaged by said power member when the pawl stop surface initially engages said stop and the cam slope continues to be engaged during an interval of continued rotation of the output driver member as the pawl element disengages from the pawl-receiving member.

4. A one-revolution clutch mechanism comprising a pawl-receiving member mounted on a rotatable shaft for rotation therewith, an output driver member freely rotationally mounted on said shaft, a pawl movably mounted on said driver member and having an element movable into engagement with said pawl-receiving member to cause rotation of said driver member by the pawl-receiving member, means yieldably urging said pawl in a direction to cause said engagement, a movable stop engageable in one position thereof with a stop surface on the pawl to hold said pawl out of engagement, a cam operatively connected to said output driver member and having a cam slope, a movable member positioned adjacent said cam and engageable with said cam slope when said pawl stop surface is adjacent said stop, and means urging said movable member toward the cam slope in a direction to urge said cam and output driver member in the same direction as the rotative direction of said rotatable shaft.